Nov. 25, 1969     M. IGLEWITZ     3,480,067
INFLATABLE TUBELESS TIRE SEATING DEVICE WITH QUICK RELEASE

Filed Jan. 21, 1969     3 Sheets-Sheet 1

MEYER IGLEWITZ
INVENTOR.

BY *George B. Oupooth*

ATTORNEY

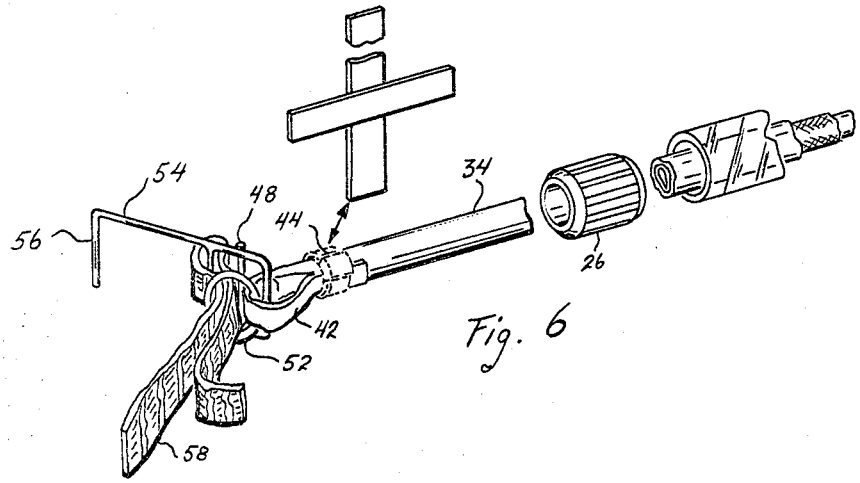
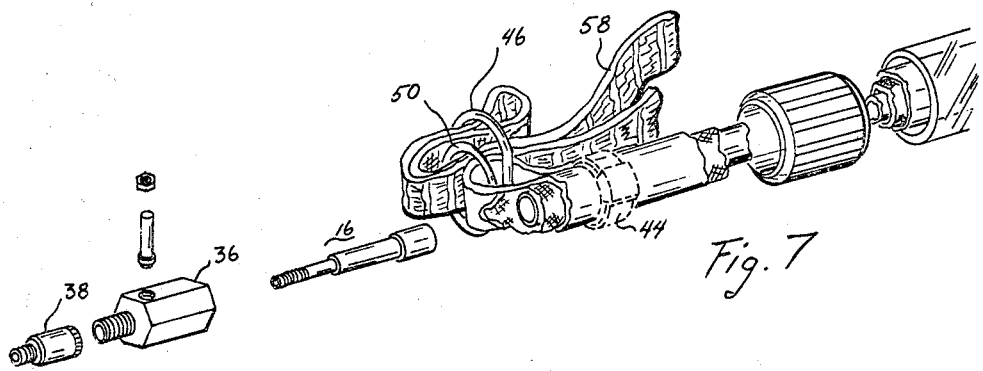
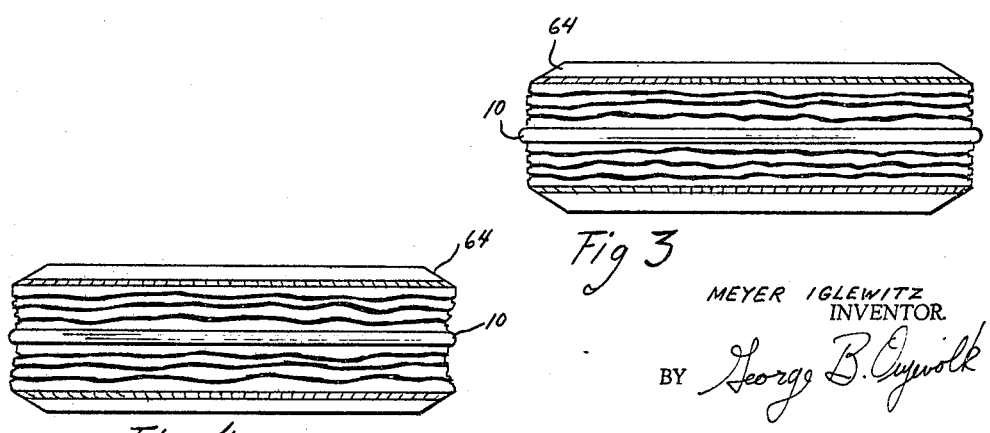

Nov. 25, 1969     M. IGLEWITZ     3,480,067
INFLATABLE TUBELESS TIRE SEATING DEVICE WITH QUICK RELEASE
Filed Jan. 21, 1969     3 Sheets-Sheet 3
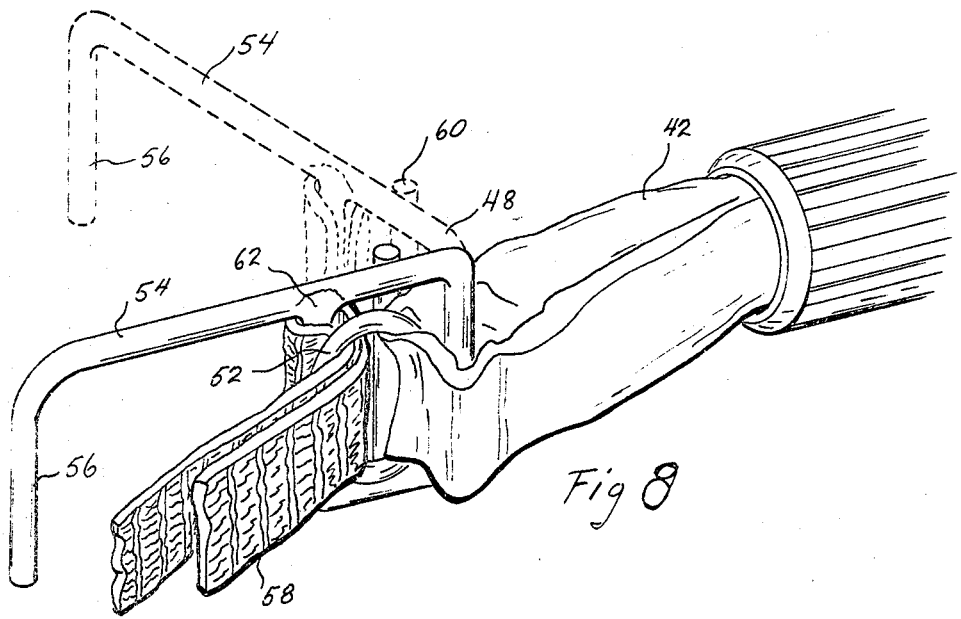
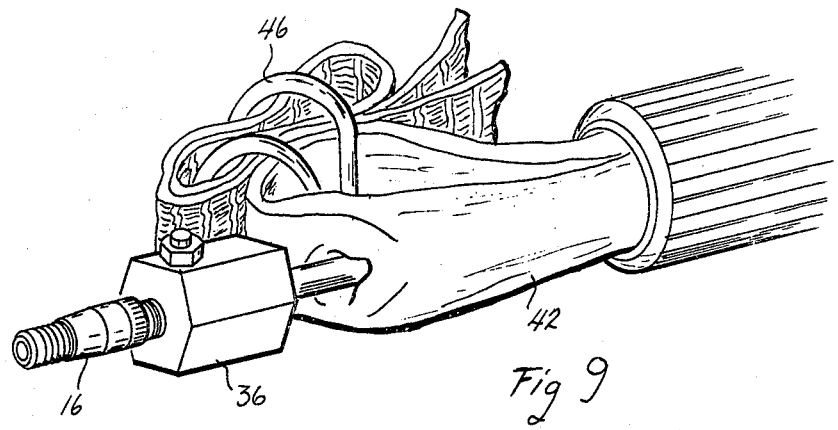
MEYER IGLEWITZ
INVENTOR.
BY
ATTORNEY United States Patent Office 3,480,067
Patented Nov. 25, 1969

3,480,067
INFLATABLE TUBELESS TIRE SEATING DEVICE WITH QUICK RELEASE
Meyer Iglewitz, 178 Sherman Ave., Newark, N.J. 07114
Continuation-in-part of application Ser. No. 710,494, Mar. 5, 1968. This application Jan. 21, 1969, Ser. No. 792,479
Int. Cl. B60c 25/12
U.S. Cl. 157—1.21                                    2 Claims

ABSTRACT OF THE DISCLOSURE

A seating belt for seating tubeless tires on a wheel rim which has an elongated flexible tube, sealed at one end, and a gas feed fitting and inlet at the other end of the tube. A cylindrical sheath with a wire mesh is placed around the tube. There are shields and collars at both ends. The fitting inlet projects past one of the collars. The seating belt is held to the tire by means of a strap which passes through buckles at said ends. One of the buckles has a release lever which will permit the strap to slide on the buckle, so that the seating belt can be placed around the tire to be mounted, and hold the tire as it expands. The flexible tube can be filled with compressed air through the inlet fitting and the belt will firmly hold the tire until the release lever is handled to release the seating belt.

---

The present application is a continuation-in-part of U.S. patent application Ser. No. 710,494, filed Mar. 5, 1968.

The present invention relates to tubeless tire seating belt which can be placed around a tubeless tire when mounting the tire on an automobile wheel rim so as to properly seat the tire on the wheel rim as it is being inflated.

The problem of mounting tubeless tires on wheel rims has already received considerable attention, and, one of the typical examples of the devices of the prior art is described in the Fleming Jr. .J. S., Patent No. 2,835,319. Generally, the prior art devices make use of specially constructed materials, i.e., special tubing and special sheaths. Thus, for the purposes of the Fleming Jr. patent, it is shown that the sheath should have individual strands of interwoven helices with a helical angle of from about 25° to 45° which can be 25° to 30° in the extended state. The difficulty with this type of sheath is that such a weave is not readily available and requires special machines or machines with special weave settings to produce the precise angular limits which are described. It has now been discovered that commercially available woven sheath may be advantageously used in combination with the gripping arrangement herein described to provide a tire mounting seating belt.

The invention as well as other objects and advantages thereof will be more readily apparent from the following detailed description when taken in conjunction with the accompanying drawings, in which:

FIG. 3 illustrates in perspective how the belt shown in FIG. 1 is placed around a tire to be mounted on a wheel;

FIG. 4 depicts the belt and tire illustrated in FIG. 3 at a later stage of the operation;

Figure 1:
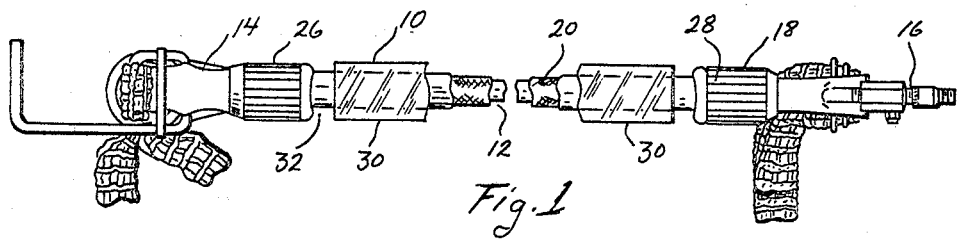
FIG. 1 is a longitudinal perspective view of the tire mounting seating belt contemplated herein.
Figure 2:
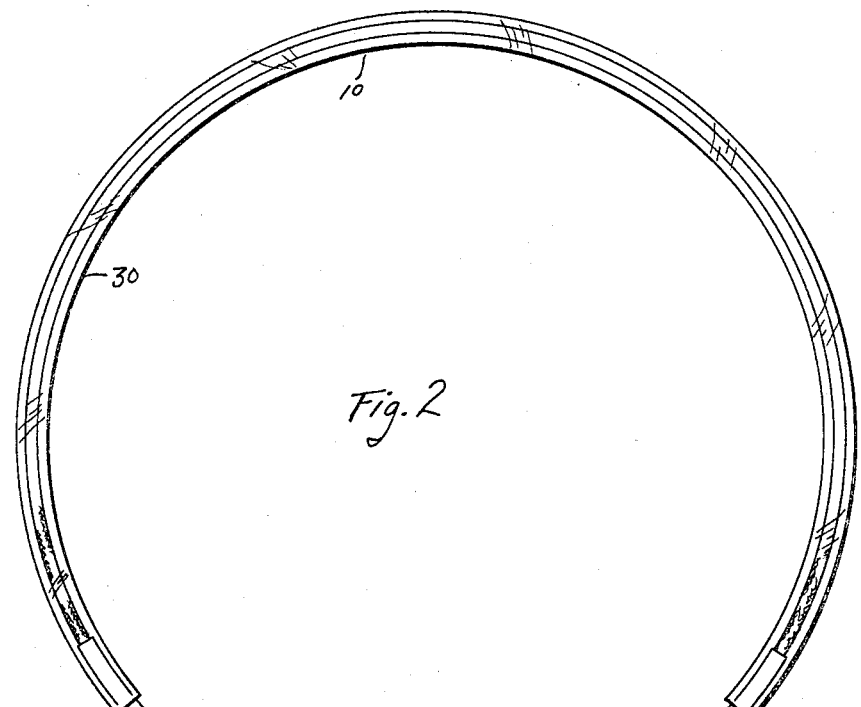
FIG. 2 is a top view of the tire mounting seating belt shown in FIG. 1.
Figure 5:
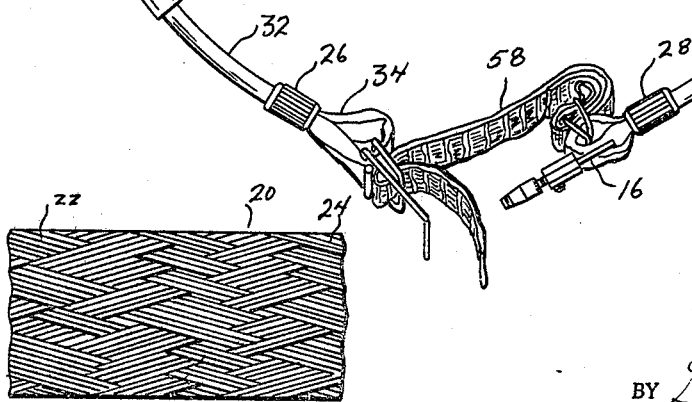

FIG. 5 provides a top view of the weave used on the belt sheath shown in FIG. 1;

FIG. 6 shows an exploded view of one end of the tire mounting seating belt shown in FIG. 1;

FIG. 7 is an exploded view of the other end of the tire mounting seating belt shown in FIG. 1;

FIG. 8 is a perspective explanation of one end of the device shown in FIG. 1; and FIG. 9 is a perspective explanation of the other end of the device shown in FIG. 1.

The tubeless tire seating belt 10, shown in the drawing has a length of inflatable tubing 12 of rubber, neoprene etc. The tubing 12 is sealed at one end 14 and has a metal inflation fitting 16 extending from the other end 18. Surrounding the tubing 12 is a woven cylindrical web sheath 20 made of a plurality of metal wires 22 each wire 22 having a plurality of individual strands 24.

Cylindrical web sheath 20 is covered with rubber or plastic collars 26 and 28 at each end. Disposed over and around the tubing 12 and sheath is an apron 30 which is made of steel, metal, rubber or plastic. The object of the apron 30 is to prevent nails from passing through to the tubing 12. This apron 30 extends freely between collars 26, 28. The collars are disposed over an inner shield 32 and an outer shield 34. The outer shields 34 and collars 26, 28 at both ends are fastened together with great pressure, e.g., by a commercially available crimping machine so that the components passing through a central apertures will be held tightly. One of the components passing through central aperture is inflation fitting 16 made of a cylindrical metal tube threaded towards a junction. Fitting 16 may be made of one or more pieces as shown in FIG. 9, and has an outer stop lock nut 38. A portion of the fitting enters the central aperture and is held fast therein. The outer portion of the fitting also holds an inlet 40 having an aperture. The fitting is further held in place by a stop-lock nut 38 engaging the threads of the fitting and permitting the fitting inlet 40 to extend outwards so as to receive a pressurized fluid, e.g., air for inflation. The outer shield 34 terminates in a tail 42 which turns back and is held by a fastener 44 over which is placed the collar 26. The tails 42 of the outer shields 34 loop through buckles 46 and 48 and rings 50, 52. One of the buckles at one end, preferably the end other than where the inlet fitting is located will have a lever 54 and a release arm 56. As shown in FIGS. 6 and 7, 8 and 9, a belt 58 extends between buckles 46, 48 and is woven at one end through buckle 48, ring 50 and firmly held in place by pulling on the belt (FIGS. 7 and 9). The other buckle 48 includes a center bar 60, and, the belt has to pass through ring 52 and the top part 62 of buckle 48. As the tire expands against the belt 58 it pulls the belt 58 and the buckle top part 62 towards the tire so as to lock the buckle to the belt preventing further motion of the belt. By moving the release arm 56 away from the tire, the release lever 54 will pull the buckle away from the locking position. The belt can then slip through the buckle.

When mounting a tire 64 on a wheel, the deflated tire is placed on wheel and the belt 10 is wrapped around the tire. The belt 58 is tightened. Then, an air valve is placed to fitting inlet 38 and the belt is inflated so as to press the bead of the tire 64 against the rim of the wheel.

Of particular importance is the weave used in the web sheath. Notwithstanding the teaching of the prior art and particularly the mathematical calculations for most effective manner of weaving provided by the workers in the art, e.g., as shown in the aforesaid U.S. Patent No. 2,835,319, the present applicant has found that the helical weave and the helical angles therein suggested are not satisfactory for applicant's purpose. Indeed, applicant's strands 24 from wires 22 which are very gradually woven around the tubing. The angles of intersection are preferably a very small angle of the order of under 20°. The engagement of wires is not helical. When expanded, the intersection of the wires change their angles considerably going from about 20° to about 75°. Furthermore, for applicant's purpose, a close weave is not used. Indeed, the wires are loosely woven with plenty of space to spare in between. The particular sheath is commercially available and is shown in several catalogues, e.g., McMaster-Carr Supply Co. (Chicago, Ill.) Catalogue pages 884 to 886.

In making the tire seating belt, commercially available cylindrical sheaths in large rolls and commercially available flexible tubing sized to fit within the sheath also in large rolls are used. Both the sheath and tubing are cut to the proper size to fit around a tire. Shields and collars are placed on the ends. One end of the tubing is sealed with a metal seal and the gas inlet fitting is placed on the other end. The tubing is inserted into the sheath with the inlet fitting extending outside of the collar. Also, the buckles and rings are fitted to the tail 42 of the sheath, and the tail folded back under the collars. The tails are first held by appropriate fasteners 44.

It is to be observed therefore that the present invention provides for a seating belt for seating tubeless tires on a wheel rim. The seating belt comprises an elongated flexible tube, sealed at one end, a gas feed fitting at the other end of the tube including an inlet for receiving a compressed gas. A cylindrical sheath is placed around the tubing. This sheath has a wire mesh, the individual wires of the mesh intersect at a small angle. Over the sheath at both ends are collars. The inlet projects through one of the collars. The collars secure an outer shield, and tails from the outer shields are folded back and retain buckles and rings. One of the buckles has a release lever with a release arm. A belt extends between buckles. This belt will be tightened by the action of the tire expanding against the tubing. When the tubing is filled with compressed air through the inlet fitting, the belt is released by pulling a lever arm away from the tire releasing the tire pressure on the belt.

I claim:
1. A seating belt for seating tubeless tires on a wheel rim, comprising in combination:
   (a) an elongated flexible tube covered by a wire mesh, sealed at one end;
   (b) a gas feed inlet fitting at the other end of said tube;
   (c) cylindrical sheath means surrounding said tube and wire mesh at least at each end, held by a collar at each end with a folded back tail portion, the inlet fitting projecting through one of said folded tail portions;
   (d) holder buckles held by the folded tail portions at each of said ends;
   (e) a strap passed through said holder buckles which is tightened by pulling on the portion of the strap past the holder buckle, the expansion of a tire against the strap locking the holder buckle against the strap preventing movement of the strap; and
   (f) a buckle release lever affixed to the buckle to pull the buckle away from locking the strap, breaking the locking action.
2. A seating belt as claimed in claim 1, said holder buckle and buckle release including a U-shaped section with ends defining a plane, a first bar across said ends, a second bar, parallel to said first bar across the center of said U-shaped section, and a lever bar affixed to one side of said U-shaped section extending outwards substantially at right angles to said first and second bar away from said first bar, in said defined plane.

References Cited
UNITED STATES PATENTS

| | | | |
|---|---|---|---|
| 2,835,319 | 5/1958 | Fleming | 157—1.21 |
| 2,918,965 | 12/1959 | Merriman | 157—1.21 |

GRANVILLE Y. CUSTER, Jr., Primary Examiner